United States Patent
Nelson et al.

(10) Patent No.: US 7,221,912 B2
(45) Date of Patent: May 22, 2007

(54) TELECOMMUNICATIONS MANAGEMENT INTERFACE SYSTEM

(75) Inventors: Donald Joseph Nelson, Woodridge, IL (US); Vipul V. Patel, Lisle, IL (US); Chetan J. Tanna, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 595 days.

(21) Appl. No.: 10/652,213

(22) Filed: Aug. 29, 2003

(65) Prior Publication Data

US 2005/0048924 A1 Mar. 3, 2005

(51) Int. Cl.
*H04B 17/00* (2006.01)

(52) U.S. Cl. .................... 455/67.11; 455/423; 709/222

(58) Field of Classification Search ............... 709/222, 709/223; 455/67.11, 423, 424, 425
See application file for complete search history.

(56) References Cited

U.S. PATENT DOCUMENTS

2003/0115304 A1* 6/2003 Murray et al. .............. 709/222

* cited by examiner

*Primary Examiner*—Lee Nguyen

(57) ABSTRACT

This invention relates to a method and apparatus for centralized control of operations, administration, maintenance and provisioning (OAMP) for a system comprising sub network elements and sub-elements from a plurality of vendors having different OAMP interfaces. The messages to and from the sub network elements are translated into a standard format for display at a centralized control terminal. Advantageously, a system administrator can control the network without having to have detailed knowledge of the OAMP interface of each element.

6 Claims, 2 Drawing Sheets

TELECOMMUNICATIONS MANAGEMENT INTERFACE SYSTEM

TECHNICAL FIELD

Figure 1:
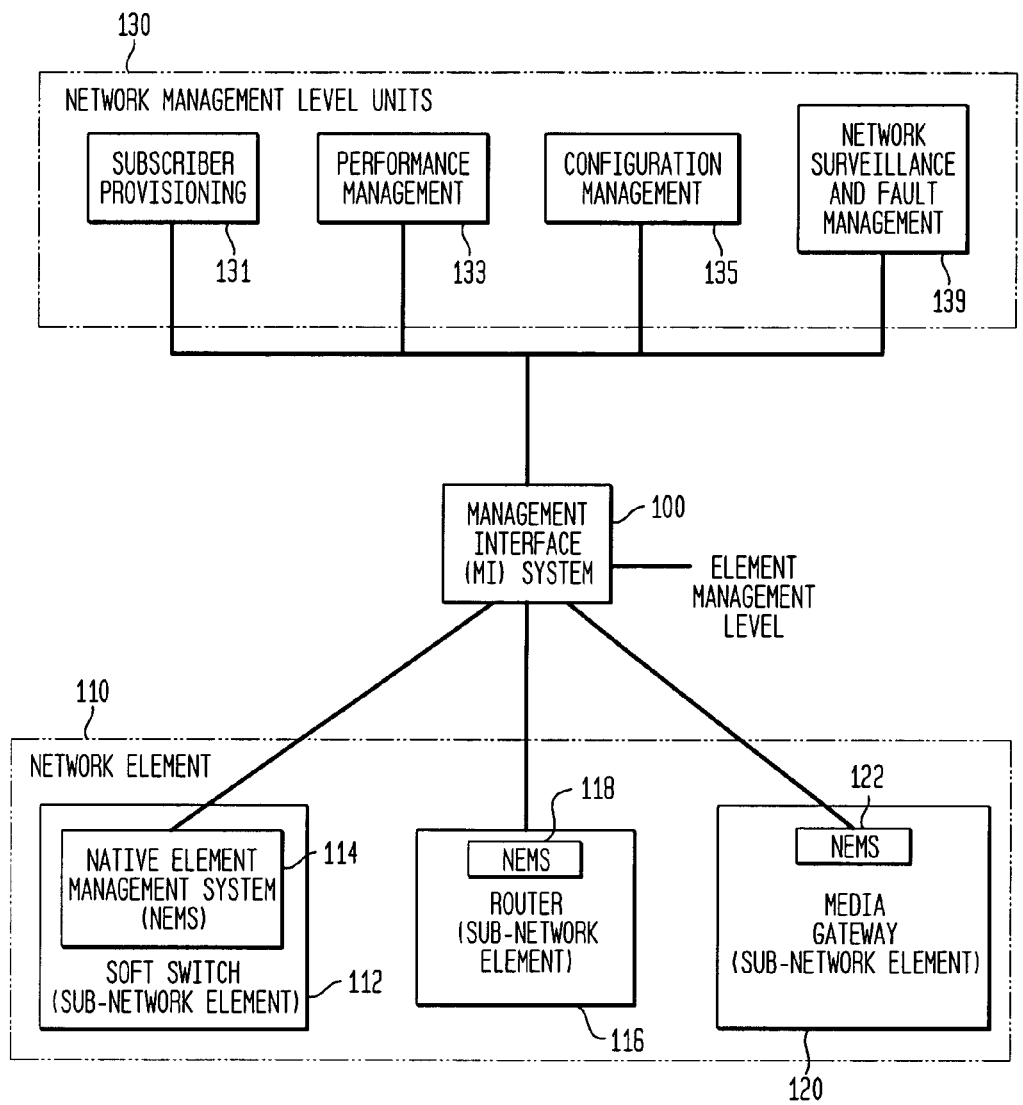

This invention relates to management information systems for use in a multi-element telecommunication network.

BACKGROUND OF THE INVENTION

Today's telecom systems are made up of different components offering different capabilities, interconnected and configured to provide advertised end-to-end services. These components, also referred to as Sub Network Elements (SNEs), based on Telecommunications Management Network (TMN) Standard, can be supplied by different vendors. Therefore, the scope of the Operations, Administration, Maintenance and Provisioning (OAMP) management capabilities offered by these components vary and are limited to the components only. Thus, managing (monitoring and maintaining) a system made up of SNEs from different vendors, with different native OAMP capabilities, different user interfaces and distributed geographically, significantly impacts the maintenance cost and system reliability.

SUMMARY OF THE INVENTION

The above problem is substantially alleviated in accordance with Applicants' invention wherein the sub network elements report to a management interface system, either directly or via an element between a core network placed between the reporting sub network element and the core; reports are translated into a standard language and format for use in the management interface system; commands emanate from the management interface system and are translated to the language of the sub network element which the information from the sub network elements can accept; reports include alarm information and performance measurements; the commands include commands for taking a sub network element out of service or to restore such a sub network element or components of sub network element to service, for performance measurements, and/or to modify elements of the database of the sub network elements. Advantageously, the display of information in a common format and the ability to issue commands in a common format allows a system administrator to control a system without requiring knowledge of intimate detailed information concerning each of the sub network elements in a particular system.

BRIEF DESCRIPTION OF THE DRAWING(S)

Figure 2:
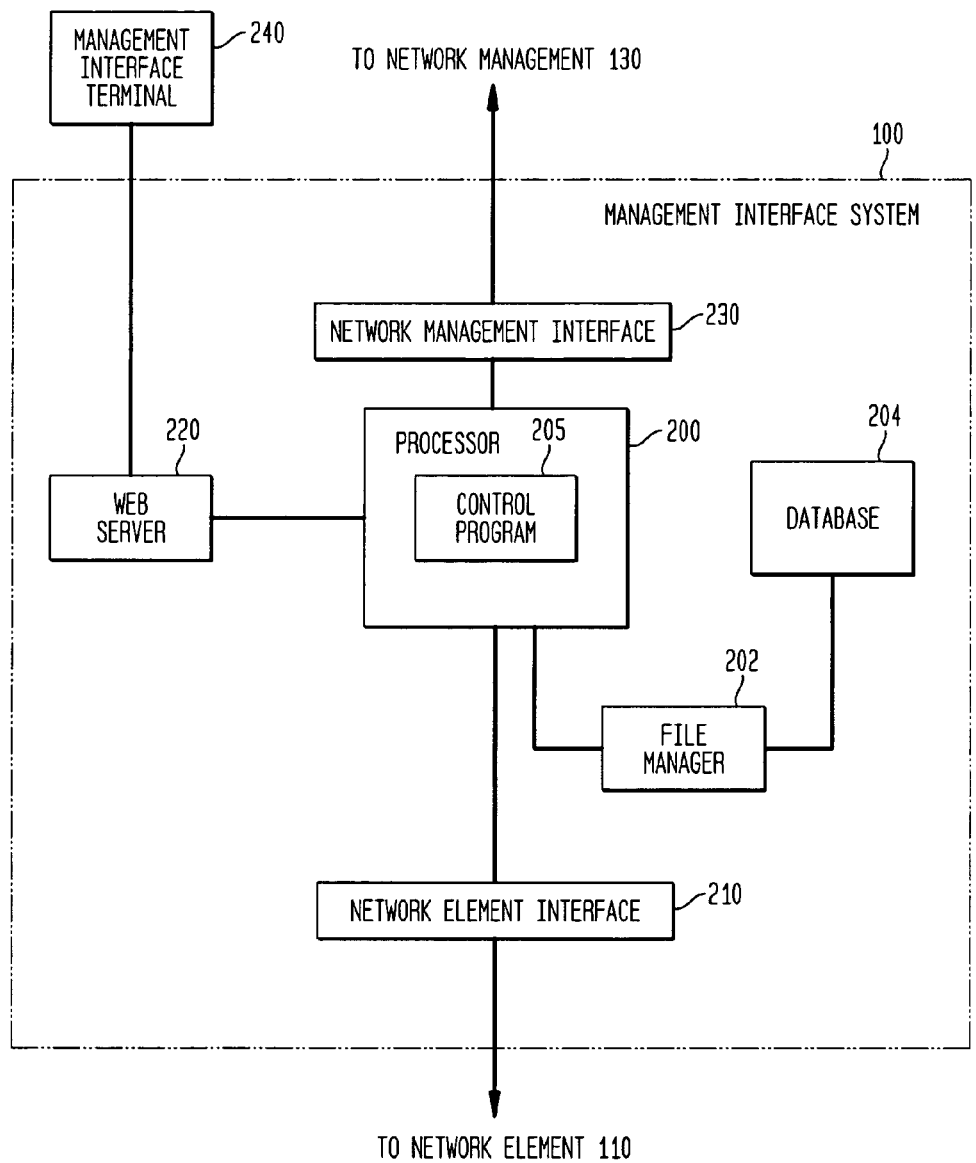

FIG. 1 is a block diagram showing the relationship between the management interface system, the network elements and sub elements and the network management systems; and FIG. 2 is a block diagram of the management interface system and its connections to other units.

DETAILED DESCRIPTION

FIG. 1 is a block diagram showing the relationship between the management interface system and on the one side the network elements and sub elements and on the other side the network management units. Shown is a connection between the management interface system 100 and a network element 110. The network element 110 includes three sub network elements a SoftSwitch 112, a router 116, and a media gateway 120. Each of these sub network elements includes a Native Element Management System (NEMS). NEMS 114, 118 and 122 serve sub network elements 112, 116 and 120, respectively. The NEMS provides the OAMP functionality for that sub network element. The management interface system 100 also communicates with network management units such as the subscriber provisioning unit 131, performance management unit 133, configuration management unit 135, and network surveillance and fault management system 139. The management interface system passes information pertinent to the functions of each of these network management units to the appropriate unit and receives commands from the appropriate unit. The functions of the management interface (MI) system are described extensively below.

The following summarizes the OA&M functions provided by the MI:

The MI provides alarm management functions for all managed SNEs. Examples of these functions include alarm collections, conversion to standards, display and logging of alarms to MI GUI and in the system logs, and forwarding alarm information to the north bound systems.

The MI provides discovery capability of the SNEs down to a Maintenance Replaceable Unit. Specific functions include discovery of physical (Ethernet) and logical connectivity (IP), storing discovery data into MI discovery database, displaying discovered components on MI GUI and forwarding this information to the northbound (i.e., network management) systems.

The MI monitors and manages the IP network through which all the sub network elements are interconnected.

The MI provides telnet and cut through access to the SNE's NEMS hosts to perform local maintenance activities.

The MI provides a single point to collect distribute and activate software updates using cut through/telnet session.

The MI provides Local Maintenance Terminal (LMT) and Remote Maintenance Terminal (RMT) capability.

The MI provides user security administration functions.

The MI provides performance measurement functions for the SNEs. This includes collection of available measurement data from the SNEs, converting data to standard format such as XML, storing into a single file and making this data available to the northbound interface.

The MI provides System Topology information to the user via the MI GUI.

The MI provides state status handling based on standards such as X.731 for the all managed SNEs and the interfaces at various levels (e.g., Component, unit, card, etc.).

The MI provides capability to initialize the system components and monitor the progress.

The MI provides capability to schedule various maintenance activities (such as configuration checks, measurements collection, backup scheduling).

The MI provides jumpstart server functions for all applications such as wireline and wireless. Jumpstart is a process of installing the system (hardware, cabling, configurations data, required platform software, application software, and establishing OAMP communications to prepare for the service) at the customer's site.

The management interface system provides a single point of access for operational, administrative, maintenance, and provisioning control for each sub network element. It provides a seamless cut through for commands and responses to sub network elements via a graphical user interface (GUI). Because the management interface system has access to the NEMS of every sub network element of the system served, problems are quickly localized to the network and sub network element. Communications exists between the management interface system and the sub network native element management system (NEMS) for detailed analysis of the problem of a particular sub network element. It is not necessary for a sub network element to have an NEMS in which case the management interface system deals directly with the sub network and exchanges messages with that unit.

The management interface system provides a homogeneous interface to the user. This homogeneous interface is arranged so that the information displayed on the graphical user interface is sub network element vendor independent. The management interface system translates between the language of commands and responses of a particular vendor for that vendor's sub network element and a standard language for use with the graphical user interface. This means that in terms of information displayed on the graphical user interface this information does not depend on the specific details of the language used by a particular vendor's equipment.

FIG. 2 is a block diagram of Management Interface System 100. The system includes interfaces 210 and 230 for communicating with sub network element 110 and the network management unit 130, respectively. The heart of the management interface system 100 is a processor 200 comprising a control program 205 for controlling the functions of the management interface system 100 as described below. A database 204 is used for maintaining provisioning information, accumulating performance measurement data, maintaining security information, maintaining system status and configuration information, accumulating inventory, and accumulating fault detection and management information prior to sending this information to network surveillance and fault management unit 139. The processor receives/transmits information in the language of the sub network elements and its sub-elements and translates this information into/from the standard language used by the processor and the graphic interface for display on a management interface terminal 240. The management interface terminal may be local or remote; if remote, it is accessed via web server 220.

In accordance with one feature of Applicants' invention, when necessary communications between the management interface system and the sub network element or between a native element management system and the sub network element or its sub element is in the native language of the particular vendor's equipment. This allows special problems hidden by the translation between the language of the graphical user interface and the language of the vendor's network sub element to be analyzed.

Each sub network element is further controlled by a local maintenance terminal, a personal computer (PC) for operations, administration, maintenance and provisioning (OAMP) control for use by onsite technicians. The information exchanged between the sub network element and the OAMP PC is passed on to the management interface system in order that that system have complete fault and alarm information available for all units served by the management interface system.

The management interface system keeps track of the element configuration of sub network units in order to determine when necessary which sub network element can be switched into service to replace a defective unit.

The management interface system also provides on line help documentation which can be downloaded to the OAMP PC if necessary.

In its role as a fault management controller, the management interface system performs essentially all aspects of fault management. It creates alarms for those sub network elements which don't have formal alarm constructs so that the graphical user interface can display all alarm conditions and that the management interface system can respond to all alarm type conditions. All alarm conditions are translated to an industry standard such as the 3GPP SA5 format. Alarm filtering capabilities are provided to help distinguish between catastrophic alarm conditions and occasional error (minor alarm) conditions. All alarm information of each sub network element is maintained in the management interface system. All alarm conditions, including multiple alarms, are maintained for each maintenance replaceable unit. Alarms are summarized by type and category. An event history, including all alarms, is maintained for each sub network entity. All autonomous event reports sent by sub network entities are logged and can be made available on the graphical user interface. All active alarms are maintained in a special active alarm list.

To allow user control of the configuration of active sub network elements and sub elements, the number of alarms and events are maintained for each such unit, the severity of the alarms is maintained, and actions taken in response to events/alarms are logged. User responses to alarms are acknowledged and an annotation field for such responses is logged and retained. Alarms can be manually cleared or deleted from the OAMP PC. The management interface system communicates with the graphical user interface and a northbound interface (the term northbound is an industry standard term for communicating with the network management level units 130).

The management interface system controls the configuration of the network elements and sub elements. One function carried out in support of configuration management is the automatic discovery of all sub network elements. If a sub network element is added to the system, the management interface system discovers its presence through the receipt of signals from that sub network element and adds that sub network element to the list of elements served by the management interface system. Effectively, the management interface system maintains a complete topology of the sub network elements including their interconnections and the type of the equipment, e.g., vendor specific information. The discovery process can be triggered during initial installation in response to a manual request automatically whenever new hardware is installed or periodically for audit purposes.

The management interface automatically discovers all the sub network elements in the network and the physical as well as logical connections among them. It supports physical layer 2 (Ethernet) connectivity and logical layer 3 (IP) connectivity. The MI identifies and reports all IP nodes on the networks. An alarm is raised if an unregistered node is discovered or if more than one node has one IP address. MI identifies and reports any changes in the IP configuration on all IP nodes discovered. A baseline configuration is saved on the MI. If the configuration used by an IP node is different from the baseline configuration, an alarm is raised. MI also monitors and report performances of the IP network. If network performance degradation is detected, an alarm is raised.

The automatic discovery is used in support of growth activity for the system supported by the management interface system. An inventory of all sub network units is captured in the standard XML (eXtended Markup Language) format for uploading to the network management level systems.

Network management level units can be served by more than one management interface system.

The management interface system maintains the state and status of all sub network element and sub element units. The state information is translated to X.731 standard state information. The state information is synchronized to the actual state of the various network element and sub element units and is changed when the configuration of the system is changed. The state can be locked so that, for example, administrative changes cannot be made if a unit has no available replacement that is in a state in which it could serve customers.

The management interface system can execute commands received from remote terminals over a command line interface (CLI) and can execute these commands in a transparent manner as if the commands had been generated in the management interface system.

For the administration of software, all software upgrades are downloaded to the management interface system. The system has tools to distribute such software upgrades to each pertinent sub network unit. The management interface system checks on the version of software upgrades to ensure that downloaded software upgrades are compatible with existing software on the sub network element or sub element which is the candidate for the software upgrade. The management interface system provides tools to back up each network element or sub element configuration data and to restore the configuration data for each such element.

The management interface system has the ability to initialize all sub network elements and, in some cases, to initialize at lower levels (replaceable circuit cards).

The management interface system provides information to performance management unit 133. This information conforms to the standards including 3GPP TS 32.104 and 3GPP2 S.S0028. Performance measurement information is gathered in sub network elements and periodically retrieved and sent to the management interface system. In addition, user specified measurements are periodically collected via Simple Network Management Protocol (SNMP). The retrieved files are sent to the management interface system and deleted from the sub network element. All performance measurement results are transformed into the standard XML format and made available to be retrieved by the performance management system 133. Performance measurements are archived in the management interface system for up to three days to allow trouble conditions to be analyzed. Performance measurement files are available for upload to the performance measurement system 133. Performance measurements can be viewed on the graphical interface unit.

Another important function of the management interface system is security to ensure that only authorized users can enter commands and other requests into the system. The management interface system checks that agents using the graphical user interface or command line interface (CLI) are properly authorized and are authorized to perform the types of commands being issued. Access to the management interface system (local or remote) is via a login and password and audit trails are maintained to identify the user source of commands. Users are mapped into groups and types of operations are mapped into groups.

The graphical user interface (GUI) can be a web enabled interface, a JAVA based interface, and can be executed on any hardware platform. The graphical user interface includes facilities to cut through to a native management system for communicating in native mode to sub network elements that use a different command language. The graphical user interface can communicate with the administrative processor of each network or sub network element via an internet protocol port or a console port of the administrative processor. The graphical user interface can display the discovery status, can display connectivity between sub network elements, can display alarms and status of all elements of the system served by the management interface system. The graphical user interface has facilities for browsing over alarms, events that have been logged, performance measurements, and database events. Alarm filtering and categorization can be displayed on the graphical user interface. Special user defined configuration information can be displayed including custom views for alarm event and performance measurement viewers indications of alarm severity, color representation of alarm severity and discovery interval (to determine how often to audit the sub network element information). Finally, the graphical user interface can display on line help information to the graphic user.

The management interface system can accept commands over a command line interface for software administration, start and re-start of software platform, discovery control, inventory control, database access and configuring system naming parameters. A command line interface can also invoke a remote command/script for any sub network element and can be connected to console port access for any sub network element.

The management interface system communicates with network management level units. It communicates alarm information for alarm management to allow the configuration management unit 135 to request configuration changes. The alarm information for third generation units is sent in the 3GPP SA5 format. Alarm synchronization is to ensure that the alarms on the MI are consistent with the northbound system. Some alarms may get lost during transfer from MI to northbound systems.

State changes are sent autonomously independent of actions taken by the management interface system. The state information is sent in the ITU-TX.731 format. Discovery and inventory information are sent to the network management units. Performance measurement reports are sent to these units.

The Management Interface System supports standard protocols such as File Transfer Protocol (FTP), SNMP to communicate to the northbound systems.

The above description is of one preferred embodiment of Applicants' invention. Other embodiments will be apparent to those of ordinary skill in the art without departing from the scope of the invention. The invention is limited only by the attached claims.

We claim:

1. In a telecommunications network, comprising a plurality of sub network elements served by a plurality of different network management level units, a management interface system comprising:
   means for receiving reports of events from said sub network elements;
   means for translating said reports in said management interface system into a plurality of standard languages and formats for use by said network management level units and transmitting the translated reports to said network management level units;
   means for translating commands in said standard languages received from said network management level units into a language of a sub network element for which said commands are destined; and means for transmitting the translated commands to the sub network element for which it is destined;

wherein said management interface system is adapted to communicate with sub network elements from different vendors using different command languages.

2. The apparatus of claim 1 wherein said means for receiving reports comprises:

means for receiving performance measurement data from said sub network elements.

3. The apparatus of claim 2 wherein said means for translating said reports comprises:

means for transmitting performance measurement data to a network management center.

4. In a telecommunications network, comprising a plurality of sub network elements served by a plurality of different network management level units, a method of managing said plurality of sub network elements, comprising the steps of:

receiving reports of events from said plurality of sub network elements;

in a management interface system, translating said reports into a plurality of standard languages and formats for use by said network management level units and transmitting the translated reports to said network management level units;

translating commands in said standard languages, received from said network management level units into a language of a sub network element for which said commands are destined; and transmitting the translated commands to the network or sub network element for which it is destined;

wherein said management interface system communicates with sub network elements from different vendors using different command languages.

5. The method of claim 4 wherein the step of receiving reports comprises the step of:

receiving performance measurement data from said sub network elements.

6. The method of claim 5 wherein the step of transmitting the translated reports comprises the step of:

transmitting accumulated performance measurement data to a network management center.

\* \* \* \* \*